Sept. 10, 1940.  C. J. KINNISON ET AL  2,214,168
FRUIT PITTER
Filed April 30, 1937   2 Sheets-Sheet 2
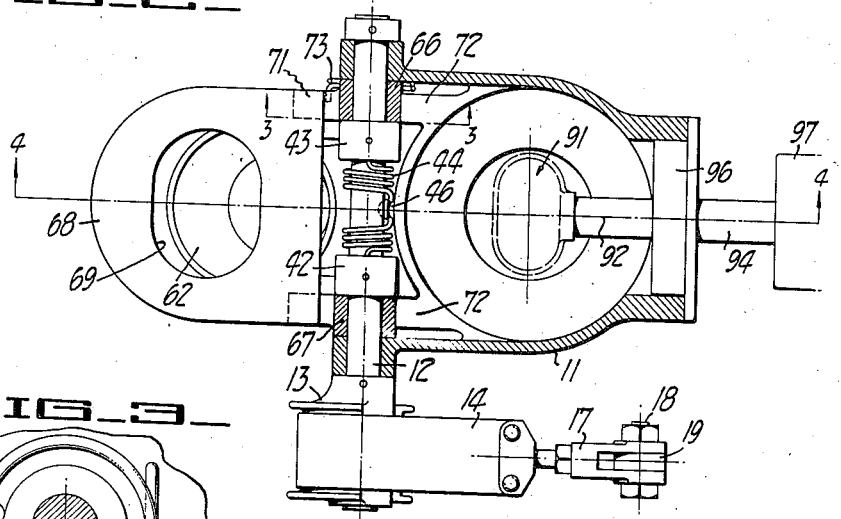
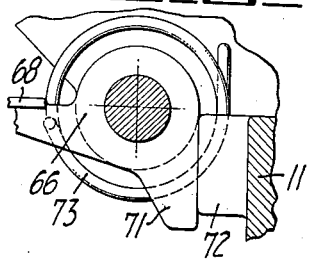
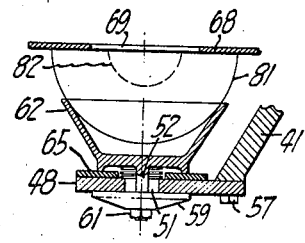
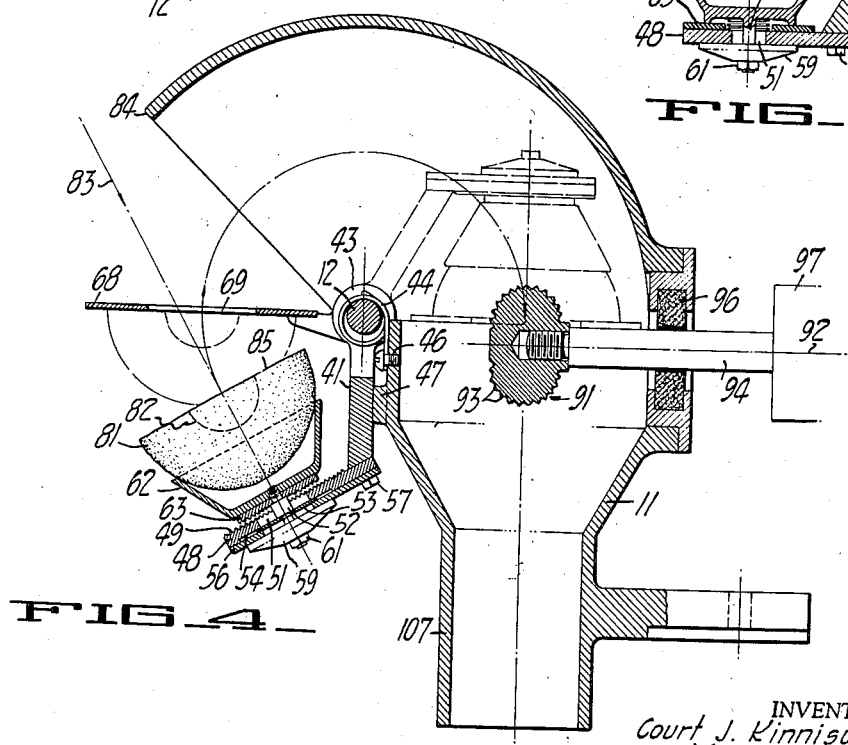
INVENTORS
Court J. Kinnison
Marcus Lothrop
BY Marcus Lothrop
ATTORNEY.

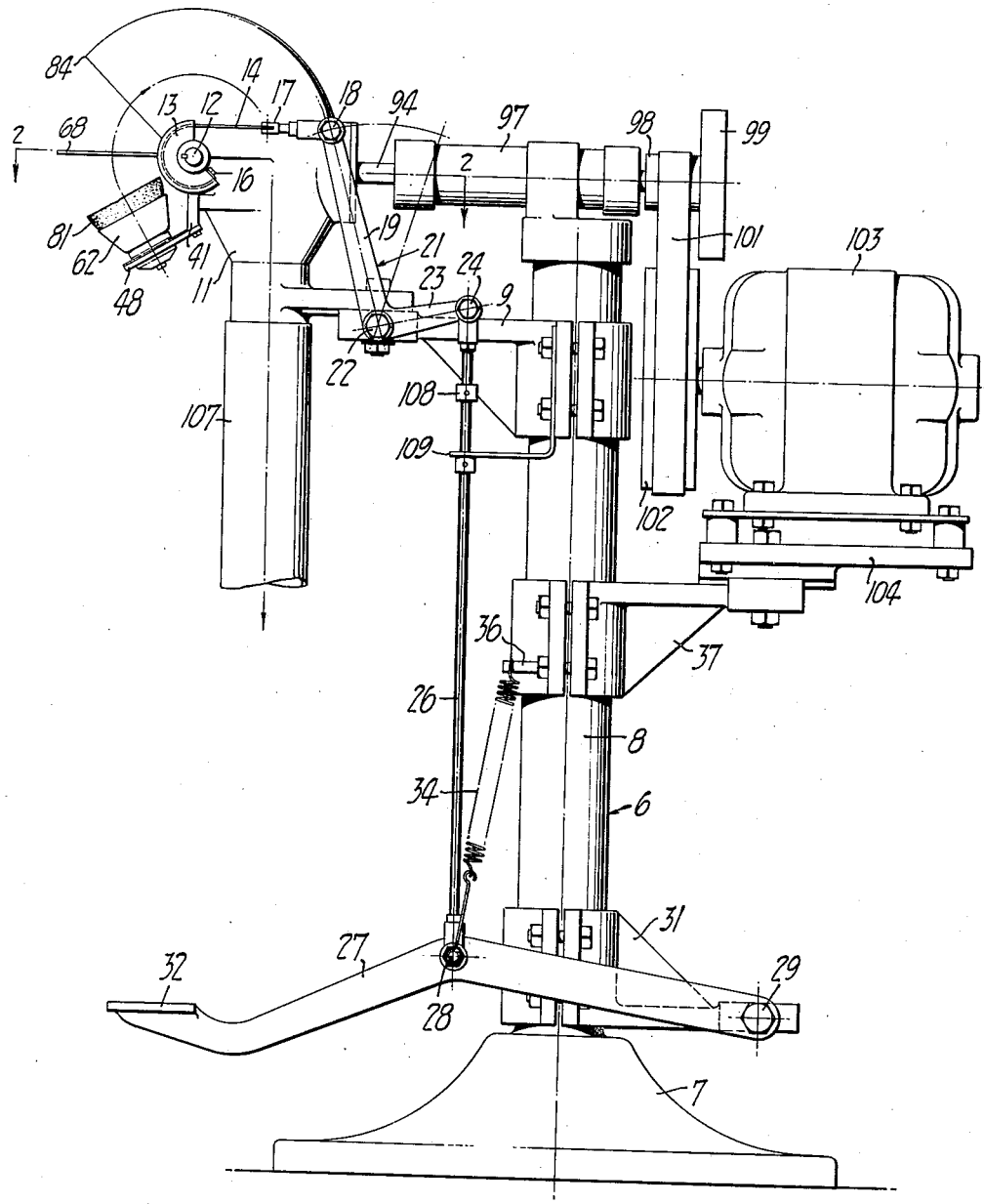

Patented Sept. 10, 1940

2,214,168

UNITED STATES PATENT OFFICE 2,214,168

FRUIT PITTER

Court J. Kinnison, Alameda, and Marcus Lothrop, Berkeley, Calif.; said Lothrop assignor to said Kinnison Application April 30, 1937, Serial No. 139,920

14 Claims. (Cl. 146—28)

Our invention relates to machines for removing the pits from drupaceous fruits, such as peaches, and is especially concerned with removing the pits from clingstone varieties of peaches used in commercial canning.

An object of our invention is to provide an improved fruit pitter.

Another object of our invention is to provide means for removing the pit of a fruit in an expeditious manner, to provide a product comparable in quality to hand-pitted fruit.

Another object of our invention is to provide a fruit pitter which will remove the pit from fruit despite reasonable variations in size of successive fruits treated.

A further object of our invention is to provide a fruit pitter in which the pit and some of the surrounding fruit flesh will be cleanly removed yet in which no excessive flesh will be excised.

The foregoing and other objects are attained in the embodiments of the invention shown in the drawings, in which—

Fig. 1 is a side elevation of a fruit pitter constructed in accordance with our invention;

Fig. 2 is a cross-section the plane of which is indicated by the line 2—2 of Fig. 1;

Fig. 3 is a cross-section the plane of which is indicated by the line 3—3 of Fig. 2;

Fig. 4 is a cross-section the plane of which is indicated by the line 4—4 of Fig. 2;

Fig. 5 is a detail cross-section, similar to Fig. 4, but showing the cup in an advanced position.

In its preferred form, the fruit pitter of our invention is designed to operate upon a half-fruit with a half-pit embedded therein, and includes a means for holding the half-fruit while a continuously rotating pitting instrumentality comminutes and displaces the undesired pit.

As disclosed in the drawings, the pitter of our invention preferably includes a framework 6 made up of a suitable base 7 and a supporting column 8. Clamped to the supporting column 8 is an upper bracket 9 to which is attached a pitter guard 11 preferably in the form of a housing, generally toroidal in contour and extending in the general direction of the machine operator. Piercing the guard 11 is a transverse shaft 12, suitably journaled for rotation, and at one end carrying a pulley 13 fastened to the shaft and to which a strap 14 is secured by fastenings 16.

The strap terminates in a yoke 17 fastened by a pivot pin 18 to one arm 19 of a bell crank, generally designated 21. A stud 22 forms a fulcrum for the bell crank 21 and is in engagement with the bracket 9. The other arm 23 of the bell crank is connected by a pin 24 to a rod 26 extending to an operating lever 27 and articulated thereto by a pin 28. The lever 27 is pivoted about a stud 29 fixed in a bracket 31 clamped to the column 8, and at its other end is formed to provide a foot treadle 32 for operation by the machine operator. A coil spring 34 is engaged with the stud 28 and with a fastening 36 for a bracket 37 engaging the column 8, and ordinarily retains the lever 27 in its uppermost position, with the parts as shown in Fig. 1. Depression of the pedal 32 against the urgency of the spring 34 rotates the shaft 12 in a clockwise direction, as seen in Fig. 1.

Upon the rotary shaft 12 is disposed an arm 41 having branched ends 42 and 43, which are fastened to the shaft 12. A coil spring 44 encompasses the shaft 12 and at opposite ends projects into the ends 42 and 43 and, adjacent its middle, is secured by a fastening 46 to the guard 11. Under constraint of the spring 44, the arm 41 is urged into a position against a stop 47 on the guard 11. Mounted on the arm 41 is a fruit-supporting means. Secured to the arm 41 is a plate 48 having rectangular serrations 49 in its upper surface. The plate has an enlarged central aperture 51, through which passes a stud 52. Encompassing the stud is an annular spring washer 53, confined between a recess 54 on the lower face of the serrated plate 48 and a bottom plate 56, retained by the same fastening 57 which holds the plate 48 onto the arm 41. The lower portion of the stud 52 carries a closure washer 59, held in place by a nut 61.

The relationship of the stud 52 with respect to the arm 41 is such that it is freely movable in two dimensions in the general plane of the recess 54 and is slightly movable in the direction of the axis of the stud 52 upon flexure of the spring washer 53. This arrangement is utilized to provide an appropriate mounting for a fruit-engaging cup 62 which is generally conical in shape and on its lower face carries a serrated plate 63 matching the serrated plate 48. When the cup 62 is in an inactive position, the springiness of the washer 53 maintains the serrations 49 out of contact, and the cup and the stud 52 may be shifted to and disposed in any desired location within the aperture 51; but whenever the cup 62 is translated axially of the stud 52, or downwardly as seen in Fig. 4, the serrated plates 63 and 48 come into engagement and effectively lock the cup 62 against movement in any way except a releasing movement to disengage the serrations.

As an alternative to the serrated locking surfaces of the plates 48 and 68, there is shown in Fig. 5 an arrangement in which the support arm 41 is provided with a friction plate 65 on the fruit-holding cup 62. With this embodiment, the cup may be held frictionally in any rotated position, as well as in any position of translation in two dimensions.

Also mounted on the shaft 12, by bosses 66 and 67 which are freely journaled, is a plate 68 having an aperture 69 therethrough. The aperture 69 is of the general contour, somewhat conventionalized, of the largest cross-section of the pit of the fruit to be pitted on the machine, and is so located as to be in general registry with the central part of the cup 62. The bosses 66 and 67 are provided with depending lugs 71 which engage stops 72 on the guard 11, so that the plate 68, when inactive, occupies a generally horizontal position as shown in Fig. 4, being urged against the stops by a coil spring 73 one end of which engages the boss 66 and the other end of which is fast on the shroud or guard 11.

In the use of the machine, a half-fruit 81, such as a peach, for example, is placed by the operator in the cup 62 substantially as shown in Fig. 4, with the half-pit 82 readily visible through the aperture 69, substantially along the operator's line of sight 83, the forward edge 84 of the guard 11 being cut away for this purpose; so that the half-pit 82 can be appropriately oriented in the machine by direct vision of the operator. The fruit 81 has its cut surface 85 substantially coinciding with the plane of maximum area of the pit, which ordinarily coincides likewise with the suture on the exterior surface of the fruit and likewise includes the fruit stem end and the fruit flower end. When the fruit 81 is placed within the cup 62, it is freely movable in two directions (and in the Fig. 5 modification may be rotated) by reason of the movement of the stud 52 within the aperture 51, and the operator orients the fruit so that the pit 82 is substantially centralized and is approximately in registry with the aperture 69.

The operator then steps on the pedal 32 to rotate the arm 41 and the cup 62 in a generally clockwise direction, as seen in Fig. 4, until such time as the cut surface 85 of the fruit abuts the underside of the plate 68. Slight further movement of the pedal 32 presses the fruit against the plate 68 in turn held by the urgency of the spring 73, and the operator's hand can then be removed therefrom, the fruit being appropriately centralized and firmly held. Movement of the parts into this relationship is sufficient to engage the serrated plate 68 with the serrated plate 63. The half-fruit 81, with its contained pit 82 in registry with the aperture 69, is therefore firmly locked against displacement in any direction between the cup 62 and the plate 68. Further depression of the pedal 32 then rotates the fruit 81, the cup 62 and the plate 68, as a unit, about the axis of the shaft 12 and into the interior of the guard 11. Such rotation is continued until the assembly is substantially inverted over a pitting instrumentality 91.

The device 91 is preferably in the nature of a burr or cutter of metal. It is a body symmetrical about an axis of rotation 92 and preferably in cross-section is conventional of the shape of the aperture 69 and of the cross-section of the fruit pit 82. Substantially all of the exposed surface of the instrumentality 91 is occupied by cutting members 93 in the nature of rasp teeth or in the nature of blades, so that the exterior envelope of the cutters or blades 93 is a surface of revolution about the axis 92 as a center. The burr 91 is mounted on the extremity of a driving shaft 94 extending through a shaft seal 96 and into a bearing housing 97 mounted on the top of the column 8 and terminating in a pulley 98 and a flywheel 99. A belt 101 joins the pulley 98 with a pulley 102 on a driving motor 103 mounted on a vibration-absorbing platform 104 secured to the bracket 37. During the operation of the machine, the motor 103 is continually energized and continuously rotates the burr 91 about the axis 92. Hence, in the final clockwise movement of the assembly of the plate 68, the fruit 81 and the cup 62, the fruit half-pit 82 is gradually lowered onto the burr 91.

In most drupaceous fruits the interior of the half-pit is concave, there being customarily a very soft kernel which readily dislodges or falls out when the fruit is cut into two pieces. This internal concavity of the half-pit is substantially of the same configuration as the exterior of the pit and, when it comes first into contact with the burr 91, tends to exert a final slight adjusting displacement of the fruit within the cup 81. The burr 91 is rotated at a high rate of speed, preferably in the neighborhood of thirteen to fourteen thousand revolutions per minute, and, as the pedal 32 is continually depressed, the half-pit of the half-fruit 81 is gradually fed onto the burr 91. The pit is rapidly comminuted into a very fine powder or dust, which customarily flies off the burr centrifugally and is discharged through an outlet spout 107 into any suitable discharge receptacle.

As the fruit is fed onto the burr 91, a depression is ground or cut into the pit and into the fruit, which gradually increases in both lateral dimensions as well as in depth. Preferably, there is an adjustable stop 108 on the rod 26, which contacts an abutment 109 depending from the bracket 9 and which is set for the general size of fruit being handled. The pedal 32 is depressed until the stop 108 contacts the abutment 109, at which time the cup 62 has forced the fruit sufficiently far onto the burr as to remove all of the pit thereof and a portion of the flesh surrounding the pit, which customarily is of a different color than the remainder of the fruit flesh and hence is customarily cut out.

Upon completion of the pitting operation, the foot pedal 32 is released by the operator, the spring 34 restores the linkage mechanism, and the spring 44, assisted by the spring 73, returns the plate 68, the fruit 81 and the cup 62 as an assembly in a counterclockwise direction, as seen in Fig. 4, substantially into their original position, the plate 68 stopping when the lugs 71 abut the projections 72, and the cup 62 continuing its movement until it hits the stop 47 which it does with considerable abruptness, this usually being sufficient to dislodge the pitted half-fruit 81 into any suitable receptacle.

Because of the exceedingly high speed of operation of the burr 91, and because the pit is removed in the form of very small comminutions or powder or dust, there are no broken slivers of pit within the flesh of the peach to cause difficulty, there are no torn or ragged edges around the excavation made by the pitter, the tip of the pit is removed as well as the remaining portions thereof, and even if the fruit-half which has been pitted was originally a "split pit," the burr 91 removes the various split portions thereof in the shape of powder without harming the fruit-half. It has been found in practical operation that the device described produces a pitted fruit which in all respects is equal to or superior to hand-pitted fruits.

We claim:

1. A fruit pitter comprising means for holding a drupaceous half-fruit with the half-pit exposed, and means including a rotary burr having a cross-sectional contour corresponding to the cross sectional contour of said half-pit for comminuting and displacing comminuted portions of said half-pit.

2. A fruit pitter comprising means for holding a drupaceous fruit by engagement with the flesh thereof, said fruit having a half pit and means including a rotary burr having a cross-sectional contour corresponding to the cross-sectional contour of said half-pit for comminuting the pit of said held fruit.

3. A fruit pitter comprising means for holding a drupaceous cut fruit by engagement with the cut surface thereof, said fruit having a half pit and means including a rotary burr having a cross-sectional contour corresponding to the cross-sectional contour of said half-pit entering the fruit from said cut surface for comminuting the pit of said held fruit.

4. A fruit pitter comprising a plate having an aperture therein, means for holding a drupaceous half-fruit with the half-pit thereof in registry with said aperture, and means including a rotary burr having a cross-sectional contour corresponding to the cross-sectional contour of said half-pit operating through said aperture for comminuting said half-pit.

5. A fruit pitter comprising a plate having an aperture therein, means for holding a drupaceous half-fruit with the half-pit thereof in registry with said aperture, means including a rotary burr having a cross-sectional contour corresponding to the cross-sectional contour of said half-pit for comminuting said half-pit, and means for moving said plate and said half-fruit for operation of said comminuting means through said aperture and upon said half-pit.

6. A fruit pitter comprising a pitting burr having a shape in cross-section substantially the same as that of a drupaceous pit to be removed thereby, means for rapidly rotating said burr, and means for presenting to said burr a fruit to be pitted.

7. A fruit pitter comprising a rotatable burr having a shape in cross-section substantially the same as that of a drupaceous pit to be removed thereby, means for rotating said burr rapidly, and means for presenting to said burr the pit of a drupaceous fruit to be pitted.

8. A fruit pitter comprising a pitting burr, means for rotating said burr continuously at high speed, a guard around said burr, and means engaging a cut surface and an exterior surface of a half-fruit for moving said half-fruit to be pitted into said guard and presenting said half-fruit to said burr.

9. A fruit pitter comprising a frame, a burr for pitting drupaceous fruit rotatably mounted on said frame, means on said frame for holding a half-fruit by engaging with a cut surface and an exterior surface thereof and presenting said half-fruit to said burr, and means on said frame for rotating said burr at high speed.

10. A fruit pitter comprising a frame, a rotatable burr for pitting drupaceous fruit on said frame, means on said frame for continuously rotating said burr, means on said frame for holding a drupaceous half-fruit to be pitted by engaging opposite sides of said half-fruit, and means controlled by an operator for moving said holding means to present said half-fruit to said pitting burr.

11. A fruit pitter comprising a frame, a guard on said frame, a rotatable drupaceous fruit pitting burr within said guard, means for continuously rotating said burr, means on said frame adjacent said guard for holding a drupaceous half-fruit to be pitted, and a member immediately movable by an operator for moving said holding means to present said half-fruit to said burr for pitting.

12. A fruit pitter comprising a plate having an aperture therein, means for holding a drupaceous half-fruit with the half-pit thereof in registry with said aperture, means comprising a burr having a convex grating surface operating through said aperture for comminuting said half-pit, and means for rotating the burr on a fixed axis at high speed, and the said axis of rotation of the burr while operating on the pit being parallel to the plane of the plate.

13. A fruit pitter comprising a plate having an aperture therein, a rotatable burr having a cross-sectional contour corresponding to the cross-sectional contour of a drupaceous half-pit relatively movable into and out of said aperture, and means for holding a drupaceous half-fruit with the half-pit thereof in registry with said aperture.

14. A fruit pitter comprising means for holding a drupaceous half-fruit with the half-pit thereof exposed, and a rapidly rotatable, pit-pulverizing burr movable against said half-pit and into said half-fruit as said half-pit is pulverized by said burr.

COURT J. KINNISON.
MARCUS LOTHROP.